United States Patent [19]
Scheim

[11] Patent Number: 6,020,449
[45] Date of Patent: *Feb. 1, 2000

[54] ALKOXY-CROSSLINKING RTV1 SILICONE RUBBER MIXTURES

[75] Inventor: Uwe Scheim, Coswig, Germany

[73] Assignee: Wacker-Chemie GmbH, Munich, Germany

[ * ] Notice: This patent is subject to a terminal disclaimer.

[21] Appl. No.: 09/093,772

[22] Filed: Jun. 9, 1998

[30] Foreign Application Priority Data

Jun. 17, 1997 [DE] Germany ............................ 197 25 517

[51] Int. Cl.⁷ .................................................. C08G 77/26
[52] U.S. Cl. .............................................. 528/34; 528/901
[58] Field of Search ........................................ 528/34, 901

[56] References Cited

U.S. PATENT DOCUMENTS

| | | | |
|---|---|---|---|
| 3,378,520 | 4/1968 | Sattlegger et al. .......................... | 528/34 |
| 4,460,739 | 7/1984 | Ashby ...................................... | 524/702 |
| 4,528,352 | 7/1985 | Chung ...................................... | 528/18 |
| 4,826,915 | 5/1989 | Stein et al. ................................ | 524/731 |
| 5,244,938 | 9/1993 | Arai et al. ................................. | 523/206 |
| 5,434,198 | 7/1995 | Meurer et al. ............................ | 523/210 |
| 5,741,839 | 4/1998 | Scheim ..................................... | 524/188 |

FOREIGN PATENT DOCUMENTS 0 304 701   3/1989   European Pat. Off. .

*Primary Examiner*—Margaret G. Moore
*Attorney, Agent, or Firm*—Oblon, Spivak, McClelland, Maier & Neustadt, P.C.

[57] ABSTRACT

The invention relates to alkoxy-crosslinking RTV1 silicone rubber mixtures based on polydiorganosiloxanes with dialkoxyorganosiloxy end groups, the organo radical being a substituted amidoalkyl radical, which can be prepared using conventional mixing technologies. The novel RTV1 silicone rubber mixtures cure rapidly and without tack to give products with good mechanical properties. The shelf-life of the mixtures is excellent. One particular advantage of this invention is that it is also possible to create systems in which crosslinking produces only elimination products which are completely free from toxic methanol.

20 Claims, No Drawings

ALKOXY-CROSSLINKING RTV1 SILICONE RUBBER MIXTURES

BACKGROUND OF THE INVENTION

1. Field of the Invention

The invention relates to alkoxy-crosslinking RTV1 silicone rubber mixtures based on polydiorganosiloxanes with dialkoxyorganosiloxy end groups, the organo radical being a substituted amidoalkyl radical.

2. Discussion of the Background

Single-component silicone rubber mixtures (RTV1) which can be stored if water is excluded and which vulcanize to give elastomers at room temperature when water is present are known. They generally comprise a polymeric, usually linear siloxane, a compound with crosslinking action, which must contain groups which are easily hydrolyzable, a plasticizer, which is usually a methyl-terminated polydimethylsiloxane, and optional additives such as curing accelerators, pigments, processing aids and fillers. The mixtures may vulcanize under acidic conditions, e.g. in the presence of acetoxysilanes, basic conditions, e.g. using aminosilanes, or neutral conditions, e.g. by means of compounds which have oximo or alkoxy groups. RTV1 systems which crosslink under neutral conditions are necessary especially when it is important that the elimination products produced during curing of the mixtures, should not affect the substrate, as for example in the jointing of concrete or metallic materials.

For formulating RTV1 materials, a polymer with OH groups is normally used. This procedure is used, for example, with acetate-, oxime- and amine-crosslinking mixtures. It is also possible to use hydroxyl-terminated polydiorganosiloxanes in the preparation of alkoxy-crosslinking RTV1 materials. EP 384 609 and EP 543 615, for example, describe methoxy-crosslinking materials, mixed with a large amount of filler, which are prepared using OH-terminated polydimethylsiloxanes. However, this method is successful only if the polymer, the plasticizer and the fillers (in this case a combination of precipitated and ground chalk) are initially mixed with one another, followed by the addition of methyltrimethoxysilane as a crosslinking agent, and a crosslinking catalyst. This initially gives a material which has an extemely high viscosity or is even to some extent elastomeric, and which can only be processed using specific mixing technologies. The mixing technology normally used for RTV1 materials, e.g., planetary mixers and dissolvers, cannot be used. In addition, this procedure is restricted to highly filled materials. It cannot be used for transparent systems filled only with fine-particle silica. It is known that mixing a polymer having an OH-end-group with silica without a crosslinking agent gives a very highly viscous paste, which stiffens rapidly to give a hard crumbly material. When a crosslinking agent is added to a mixture of this type, the firm consistency of the paste is lost. However, it is just such firm-consistency materials which are most frequently needed. In addition, it is not possible to control the premature crosslinking of materials prepared by the prior art methods just described.

For this reason, polymers with alkoxy end groups are used for alkoxy-crosslinking RTV1 systems. Their preparation is known, and generally takes place by reacting a hydroxyl-terminated polydiorganosiloxane of a certain viscosity with alkoxysilanes in the presence of catalysts (inter alia EP 137 883, EP 304 701, EP 559 045). During this condensation reaction(elimination of alcohol), the desired polymer is formed. The preparation of the mixture comprising the alkoxy-end-group polymer can then be prepared using the method described above. However, a disadvantage of all processes previously described is that an adequate extent of reaction of the OH-end-group polymers is achieved only when methoxysilanes are used. If the ethoxysilanes known hitherto are used for preparing the polymers, complete reaction of the OH groups is not achieved. For this reason, curing of the materials can occur as early as during the preparation of the RTV1 mixtures or during storage of the finished mixtures, i.e. the products obtained have inadequate stability when stored.

It is furthermore desirable, because of the toxicity of methanol, to be able to prepare alkoxy-crosslinking RTV1 materials which produce only non-hazardous elimination products, such as ethanol.

SUMMARY OF THE INVENTION

Accordingly, one object of this invention is to provide alkoxy-crosslinking RTV1 silicone mixtures which can be prepared from polymers with alkoxy end groups using the mixing technologies which are conventionally used for other RTV1 materials. In particular, it is also possible in this way to prepare transparent alkoxy-crosslinking RTV1 pastes of firm consistency.

The invention provides alkoxy-crosslinking RTV1 silicone rubber mixtures which comprise: (a) at least one polydiorganosiloxane with dialkoxyorganosiloxy end groups, of the general formula (I)

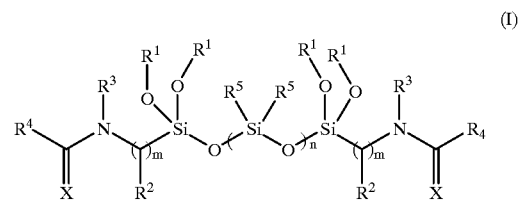

where $R^1$, independently of one another, are unsubstituted and/or substituted alkyl and/or silyl radicals, $R^2$, independently of one another, are unsubstituted and/or substituted, saturated and/or unsaturated alkyl and/or aryl radicals and/or hydrogen, $R^3$ are unsubstituted or substituted, saturated or unsaturated alkyl, aryl or acyl radicals or hydrogen, $R^4$ are unsubstituted or substituted, saturated or unsaturated alkyl or aryl radicals or hydrogen, $R^5$, independently of one another, are unsubstituted and/or substituted alkyl, alkenyl and/or aryl radicals, X is oxygen or sulfur, and wherein the radicals $R^3$ and $R^4$ may form alicyclic or heterocyclic rings, n is from 20 to 2000 and m is either 1 or 2; (b) at least one alkoxysilane and/or its partial hydrolyzates of the general formula (II)

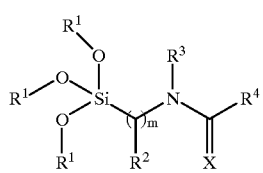

where $R^1$ to $R^4$, X and m, are as defined above; and (c) at least one organosilane and/or its partial hydrolyzate of the general formula (III)

where $R^1$ and $R^5$ are as defined above, and x is either 0 or 1.

DESCRIPTION OF THE PREFERRED EMBODIMENTS

Preferred dialkoxyorganosiloxy groups in the general formula (I) are 1-(2-pyrrolidinon-1-yl)alkyldialkoxysiloxy and/or 2-(2-pyrrolidinon-1-yl)alkyldialkoxysiloxy radicals, and also 1-(N-methylacetamido)alkyldialkoxysiloxy and/or 2-(N-methylacetamido)alkyldialkoxysiloxy radicals.

The polydiorganosiloxane of the general formula (I) may be obtained by reacting hydroxyl-terminated polydiorganosiloxanes of the general formula (IV)

$$HO(SiR^5{}_2O)_nH \qquad (IV)$$

where $R^5$ and n are as described above, with alkoxysilanes and/or their partial hydrolyzates of the general formula (II), optionally in the presence of catalysts, such as NaOH or KOH, lithium compounds, alkali metal alcoholates or Lewis acids, and at elevated temperature.

The polydiorganosiloxanes of the general formula (IV) are known. They are usually prepared either by polymerizing cyclic siloxanes in the presence of strongly basic catalysts and small amounts of water or by polycondensing short-chain linear oligomers with OH end groups. Preferred substituents $R^5$ are methyl, ethyl, phenyl, vinyl and trifluoropropyl radicals. Because of their ready availability, particular preference is given to α,ω-dihydroxypolydimethylsiloxanes in which n has values from 100 to 1600. Although the use of purely linear polymers is preferred, it is also possible to use polymers which contain branching points.

The amount of alkoxysilane of the general formula (II) which is used in preparing the polyorganosiloxane of the general formula (I), depends on the content of silicon-bonded hydroxyl groups in the polydiorganosiloxane of the general formula (IV), and is readily determined by one of ordinary skill in the in the art. The alkoxysilane is preferably used in amounts of from 0.1 to 10% by weight, preferably from 1 to 5% by weight, based on the amount of polydiorganosiloxane used. An excess of alkoxysilane may remain in the product or be removed.

The alkoxysilane of the general formula (II) is preferably used in amounts of from 0.1 to 10% by weight, particularly preferably from 1 to 5% by weight, based on the total mixture.

The alkoxysilanes of the general formula (II) may, for example, be compounds which have no silyl group bonded as radical $R^1$, and/or partial hydrolyzates thereof. Examples of these include N-1-(triethoxysilyl)ethyl-2-pyrrolidone, N-2-(triethoxysilyl)ethyl-2-pyrrolidone, N-1-(triethoxysilyl)ethyl-N-methylacetamide, N-2-(triethoxysilyl)ethyl-N-methylacetamide or mixtures thereof.

The alkoxysilanes of the general formula (II) may also be the reaction products of alkoxysilanes of the general formula (II) which contain no silyl groups, and/or of their partial hydrolyzates, with organosilanes of the general formula (III) and/or partial hydrolyzates of these, for example N-1-[(methyldiethoxysiloxy)diethoxysilyl]ethyl-2-pyrrolidone. Examples of suitable partial hydrolyzates of alkoxysilanes of the general formula (II) are 1,3-bis(1'-N-methylacetamidoethyl)-1,1,3,3-tetraethoxydisiloxane and 1-N-[(diethoxymethylsiloxy)diethoxysilyl]-2-ethylpyrrolidone. Other examples of alkoxysilanes of the general formula (II) are:

N-1-(triethoxysilyl)ethylsuccinimide

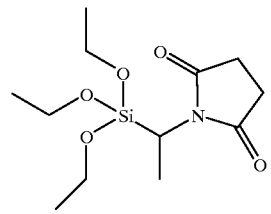

$R^1 = CH_2CH_3, R^2 = CH_3, R^3\text{---}R^4 = \text{---}CO(CH_2)_2\text{---}, X = O,$
$m = 1$ N-2-(triethoxysilyl)ethylsuccinimide

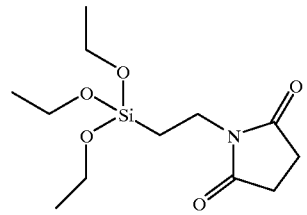

$R^1 = CH_2CH_3, R^2 = H, R^3\text{---}R^4 = \text{---}CO(CH_2)_2\text{---}, X = O,$
$m = 2$ N-1-(triethoxysilyl)ethylphthalimide

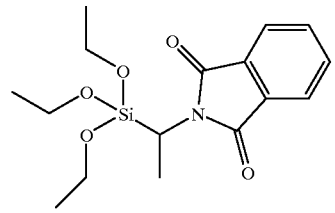

$R^1 = CH_2CH_3, R^2 = CH_3, R^3\text{---}R^4 = \text{---}COC_6H_4, X = O,$
$m = 1$ N-2-(triethoxysilyl)ethylphthalimide

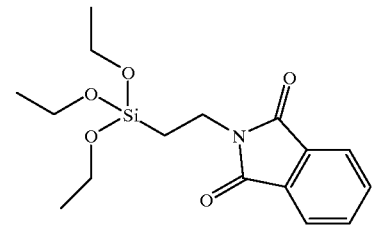

$R^1 = CH_2CH_3, R^2 = CH_3, R^3\text{---}R^4 = \text{---}COC_6H_4, X = O,$
$m = 2$ N-1-(trimethoxysilyl)ethyl-2-pyrrolidone

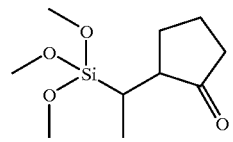

$R^1 = R^2 = CH_3, R^3\text{---}R^4 = \text{---}(CH_2)_3\text{---}, X = O, m = 1$ N-2-(trimethoxysilyl)ethyl-2-pyrrolidone

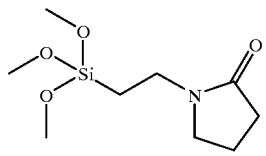

$R^1 = CH_3, R^2 = H, R^3\text{—}R^4 = \text{—}(CH_2)_3\text{—}, X = O, m = 2$

N-1-(tri-n-propoxysilyl)ethyl-N-methylacetamide

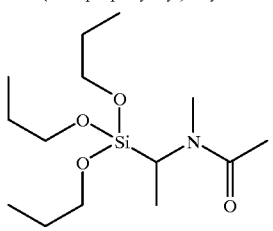

$R^1 = CH_2CH_2CH_3, R^2 = R^3 = R^4 = CH_3, X = O, m = 1$

N-2-(tri-n-propoxysilyl)ethyl-N-methylacetamide

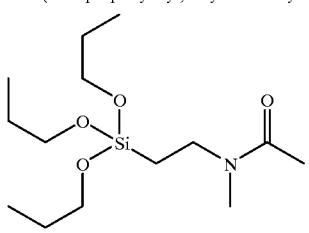

$R^1 = CH_2CH_2CH_3, R^2 = H, R^3 = R^4 = CH_3, X = O, m = 2$

N-1-(tris(2-methoxyethoxy)silyl)ethyl-N-methylthioacetamide

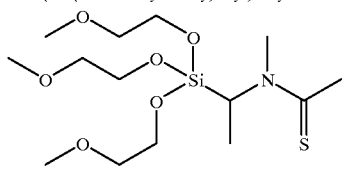

$R^1 = CH_2CH_2OCH_3, R^2 = R^3 = R^4 = CH_3, X = S, m = 1$

N-2-(tris(2-methoxyethoxy)silyl)ethyl-N-methylthioacetamide

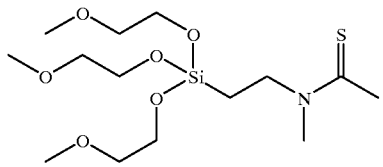

$R^1 = CH_2CH_2OCH_3, R^2 = H, R^3 = R^4 = CH_3, X = S, m = 2.$

These compounds may also be used as mixtures.

The alkoxysilanes of the general formula (II) which are used according to the invention are obtained, for example, by an addition reaction of the corresponding trialkoxysilane with the corresponding N-vinyl-substituted amide.

The organosilane and/or its partial hydrolyzate of the general formula (III) is usually present as a crosslinking agent at up to 10% by weight in the RTV1 silicone rubber mixture. Examples of these are methyltriethoxysilane, vinyltriethoxysilane, tetraethoxysilane, phenyltriethoxysilane, tetrakis(2-methoxyethoxy)silane, tetrakis(2-butoxyethoxy)silane, N-1-(triethoxysilyl)ethyl-2-pyrrolidone and N-1-(triethoxysilyl)ethyl-N-methylacetamide, and mixtures produced during the synthesis of the N-1-(triethoxysilyl)ethyl and N-2-(triethyoxysilyl) ethyl amides. It is also possible to use any desired mixture of the compounds mentioned.

Other constituents which made be added to the RTV1 mixture include: (d) up to 40% by weight of plasticizer, preferably trimethylsilyl-terminated polydimethylsiloxanes with viscosities of from 0.05 to 10 Pas, more preferably from 0.1 to 1 Pas. However, it is also possible to use methyl-terminated polydimethylsiloxanes in which some of the methyl groups have been replaced by other organic groups, such as phenyl, vinyl or trifluoropropyl. Although particular preference is given to the use of linear trimethylsilyl-terminated polydimethylsiloxanes as plasticizers, it is also possible to use compounds which contain some branching points, which are produced if the starting materials used for preparing the plasticizers contain small amounts of tri- or tetrafinctional silanes. However, instead of the siloxanes it is also possible to use other organic compounds as the plasticizer, such as certain hydrocarbon mixtures which are free from aromatic compounds, in amounts of up to 25% by weight, based on the entire mixture; (e) from 0.01 to 5% by weight of a catalyst, in order to achieve a sufficiently high rate of crosslinking. Examples of catalysts which may be used include dialkyltin compounds, such as dibutyltin dilaurate or diacetate, and/or titanium compounds, such as tetrabutyl or tetraisopropyl titanate, or titanium chelates. It is also possible to use catalyst mixtures; (f) up to 30% by weight of reinforcing fillers and/or up to 60% by weight of non-reinforcing fillers, to achieve certain mechanical properties. Preferred fillers with high specific surface area are fumed silica or precipitated calcium carbonate. It is also possible to use fillers with low specific surface area as extenders. Preference is given here to ground calcium carbonate; (g) up to 2% by weight of coupling agents, preferably alkoxysilanes substituted with functional groups. Particular preference is given to 3-aminopropyltriethoxysilane, 3-(2-aminoethyl)aminopropyltriethoxysilane and 3-mercaptopropyltriethoxysilane. It is also possible to use a mixture of alkoxysilanes substituted with functional groups; and (h) examples of other additives, depending on the application of the RTV1 systems are: color pigments and fungicides (up to 2% by weight in each case).

The mixture may be prepared continuously or in batches, by known processes. Surprisingly, it has been found that it is possible to mix RTV1 systems from the alkoxy-terminated polydiorganosiloxanes (a), the alkoxysilanes (b) and the other constituents (c) to (h) without premature crosslinking occurring during preparation of the mixture. It is also possible to prepare either transparent products of firm consistency or highly filled products. The novel RTV1 silicone rubber mixtures cure rapidly and without tack to give products with good mechanical properties. The shelf-life of the mixtures is excellent. One particular advantage is that it is also possible to create systems in which crosslinking produces only elimination products which are completely free from toxic methanol.

Having generally described this invention, a further understanding can be obtained by reference to certain specific examples which are provided herein for purposes of illustration only and are not intended to be limiting unless otherwise specified.

EXAMPLES

Example 1

450 g of an α,ω-bis[1'-(2-pyrrolidinon-1-yl) ethyldiethoxysiloxy]polydimethylsiloxane with a viscosity of 63,000 mPas, 350 g of a methyl-terminated polydimethylsiloxane with a viscosity of 100 mPas, 23 g of N-1-(triethoxysilyl)ethyl-2-pyrrolidone, 24 g of methyltriethoxysilane, 36 g of bis(ethylacetoacetato) diisobutyl titanate and 160 g of a fumed silica hydrophobicized with hexamethyldisilazane and having a surface area of about 200 m²/g were processed in a dissolver to give a firm-consistency paste, which when exposed to atmospheric moisture crosslinks to give a silicone rubber. The properties of this product are given in Table 1.

Example 2

560 g of an α,ω-bis[1'-(2-pyrrolidinon-1-yl) ethyldiethoxysiloxy]polydimethylsiloxane with a viscosity of 63,000 mPas, 240 g of a methyl-terminated polydimethylsiloxane with a viscosity of 100 mPas, 23 g of N-1-(triethoxysilyl)ethyl-2-pyrrolidone, 24 g of methyltriethoxysilane, 36 g of bis(ethylacetoacetato) diisobutyl titanate and 100 g of a fumed silica hydrophobicized with hexamethyldisilazane and having a surface area of about 200 m²/g were processed in a dissolver to give a firm-consistency paste, which when exposed to atmospheric moisture crosslinks to give a silicone rubber. The properties of this product are given in Table 1.

Example 3

450 g of an α,ω-bis[1-(N-methylacetamido) ethyldiethoxysiloxy]polydimethylsiloxane with a viscosity of 67,000 mPas, 350 g of a methyl-terminated polydimethylsiloxane with a viscosity of 100 mPas, 23 g of N-1-(triethoxysilyl)ethyl-N-methylacetamide, 24 g of methyltriethoxysilane, 36 g of bis(ethylacetoacetato) diisobutyl titanate and 160 g of a fumed silica hydrophobicized with hexamethyldisilazane and having a surface area of about 200 m²/g were processed in a dissolver to give a firm-consistency paste, which when exposed to atmospheric moisture crosslinks to give a silicone rubber. The properties of this product are given in Table 1.

Example 4

450 g of an α,ω-bis[1-(N-methylacetamido) ethyldiethoxysiloxy]polydimethylsiloxane with a viscosity of 67,000 mPas, 350 g of a methyl-terminated polydimethylsiloxane with a viscosity of 100 mPas, 23 g of N-1-(triethoxysilyl)ethyl-N-methylacetamide, 40 g of methyltriethoxysilane, 30 g of tetraisopropyl titanate and 100 g of a fumed silica hydrophobicized with hexamethyldisilazane and having a surface area of about 200 m²/g were processed in a dissolver to give a firm-consistency paste, which when exposed to atmospheric moisture crosslinks to give a silicone rubber. The properties of this product are given in Table 1.

Example 5

420 g of an α,ω-bis[1'-(2-pyrrolidinon-1-yl) ethyldiethoxysiloxy]polydimethylsiloxane with a viscosity of 63,000 mPas, 180 g of a methyl-terminated polydimethylsiloxane with a viscosity of 100 mPas, 23 g of N-1-(triethoxysilyl)ethyl-2-pyrrolidone, 27 g of methyltriethoxysilane, 30 g of bis(ethylacetoacetato) diisobutyl titanate and 60 g of a fumed silica having a surface area of about 150 m²/g and 720 g of a ground calcium carbonate coated with stearic acid were processed in a dissolver to give a firm-consistency paste, which when exposed to atmospheric moisture crosslinks to give a silicone rubber. The properties of this product are given in Table 1.

Example 6

A mixture of 20.4 g of methyltriethoxysilane and 25.8 g of N-1-(triethoxysilyl)ethyl-N-methylacetamide was mixed with 1.9 g of water in 20 ml of ethanol. After 24 hours, the product formed is distilled off together with the ethanol added as solvent. The residue was 35.5 g of an oligomeric hydrolyzate composed of 34% by weight of methyltriethoxysilane, 8% by weight of N-1-(triethoxysilyl) ethyl-N-methylacetamide, 27% by weight of N-1-[(diethoxymethylsiloxy)diethoxysilyl]ethyl-N-methylacetamide, 8% by weight of 1,3-bis(1'-(N-methylacetamido)ethyl-1,1,3,3-tetraethoxydisiloxane and 23% by weight of higher oligomeric hydrolysis/condensation products of N-1-(triethoxysilyl)ethyl-N-methylacetamide. Its make-up was determined using $^{29}$Si-NMR spectroscopy. 450 g of an α,ω-bis[1-(N-methylacetamido)ethyldiethoxysiloxy] polydimethylsiloxane with a viscosity of 67,000 mPas, 350 g of a methyl-terminated polydimethylsiloxane with a viscosity of 100 mPas, 35 g of the oligomer mixture described above, 37 g of bis(ethylacetoacetato) diisobutyl titanate and 164 g of a fumed silica hydrophobicized with hexamethyldisilazane and having a surface area of about 200 m²/g were processed in a dissolver to give a firm-consistency paste which on exposure to atmospheric moisture crosslinks to give a silicone rubber.

Comparative Example 7

In order to compare the properties of the materials obtained in the examples above, a mixture was prepared which comprises the raw materials hitherto known, but is methoxy-crosslinking, i.e. during curing a considerable amount of methanol is produced.

1150 g of a methoxy-terminated polymer which was prepared by reacting an α,ω-dihydroxypolydimethylsiloxane with a viscosity of 50,000 mPas and methyltrimethoxysilane, in the presence of zinc acetylacetonate at 80° C., 850 g of a methyl-terminated polydimethylsiloxane with a viscosity of 100 mPas, 400 g of a fumed silica hydrophobicized with hexamethyldisilazane and having a surface area of about 200 m²/g, 80 g of methyltrimethoxysilane and 30 g of bis(ethylacetoacetato) diisobutyl titanate were processed with a dissolver to give a firm-consistency paste which on exposure to atmospheric moisture crosslinks to give a silicone rubber. The properties of this product are given in Table 1.

TABLE 1

| Property | Method | Ex.1 | Ex.2 | Ex.3 | Ex.4 | Ex.5 | Comp. Ex.7 |
|---|---|---|---|---|---|---|---|
| Skin Formation Time [min] | | 30 | 60 | 25 | 25 | 60 | 20 |
| Tensile Strength [MPa] | DIN 53504 S2 | 1.26 | 1.04 | 0.96 | 0.80 | 0.95 | 1.45 |

TABLE 1-continued

| Property | Method | Ex.1 | Ex.2 | Ex.3 | Ex.4 | Ex.5 | Comp. Ex.7 |
|---|---|---|---|---|---|---|---|
| Elongation at Break [%] | DIN 53504 S2 | 650 | 499 | 522 | 400 | 450 | 630 |
| Tension at 100% Elongation [MPa] | DIN 53504 S2 | 0.41 | 0.36 | 0.34 | 0.25 | 0.47 | 0.32 |
| Shore A Hardness | DIN 53505 | 23 | 20 | 20 | 12 | 30 | 17 |

The skin formation time was measured immediately after the product was prepared. The mechanical properties (tensile strength, elongation at break, tension at 100% elongation and hardness) were determined after curing for 7 days at 23° C. and 50% relative humidity.

Having now fully described the invention, it will be apparent to one of ordinary skill in the art that many changes and modifications can be made thereto without departing from the spirit or scope of the invention as set forth herein.

German patent application P 197 25 517.5, filed Jun., 17, 1997, and from which this application claims priority, is incorporated by reference herein.

What is claimed is:

1. A crosslinking RTV1 silicone rubber mixture comprising:

(a) at least one polydiorganosiloxane with dialkoxy organosiloxy end groups, of the formula (I);

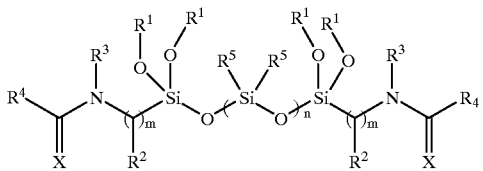

(b) at least one alkoxy silane of the formula (II) and/or partial hydrolyzates thereof,

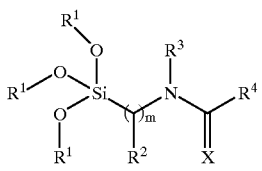

and (c) at least one organosilane of the formula (III) and/or partial hydrolyzates thereof, $$R^5_x Si(OR^1)_{4-x} \quad (III)$$

where $R^1$, independently of one another, are unsubstituted and/or substituted alkyl and/or silyl radicals, $R^2$, independently of one another, are unsubstituted and/or substituted, saturated and/or unsaturated alkyl and/or aryl radicals and/or hydrogen, $R^3$ are unsubstituted or substituted, saturated or unsaturated alkyl, aryl or acyl radicals or hydrogen, $R^4$ are unsubstituted or substituted, saturated or unsaturated alkyl or aryl radicals or hydrogen, and where the radicals $R^3$ and $R^4$ may form alicyclic or heterocyclic rings, $R^5$, independently of one another, are unsubstituted and/or substituted alkyl, alkenyl and/or aryl radicals, X is oxygen or sulfur, n is from 20 to 2000, m is either 1 or 2 and x is either 0 or 1.

2. A crosslinking RTV1 silicone rubber mixture as claimed in claim 1, wherein the polydiorganosiloxane of formula (I) is obtained by reacting a hydroxyl-terminated polydiorganosiloxane of formula (IV)

$$HO(SiR^5_2O)_nH \quad (IV)$$

where $R^5$ and n are as defined above, with an alkoxysilane of formula (II) and/or partial hydrolyzates thereof.

3. A crosslinking RTV1 silicone rubber mixture as claimed in claim 1, wherein the alkoxysilane of formula (II) or its partial hydrolyzates are compounds which have no silyl group bonded as radical $R^1$.

4. A crosslinking RTV1 silicone rubber mixture as claimed in claim 3, wherein the alkoxysilane of formula (II) is N-1-(triethoxysilyl)ethyl-2-pyrrolidone or N-2-(triethoxysilyl)ethyl-2-pyrrolidone or mixtures thereof.

5. A crosslinking RTV1 silicone rubber mixture as claimed in claim 3, wherein the alkoxysilane of formula (II) is N-1-(triethoxysilyl)ethyl-N-methylacetamide or N-2-(triethoxysilyl)-ethyl-N-methylacetamide or mixtures thereof.

6. A crosslinking RTV1 silicone rubber mixture as claimed in claim 1, wherein the alkoxysilane of formula (II) and/or partial hydrolyzates thereof contains no silyl groups, and is reacted with an organosilane of formula (III) and/or partial hydrolyzates thereof.

7. A crosslinking RTV1 silicone rubber mixture as claimed in claim 6, wherein (b) is N-1-((methyldiethoxysiloxy)diethoxysilyl)ethyl-2-pyrrolidone.

8. An alkoxy-crosslinking RTV1 silicone rubber mixture as claimed in claim 1, wherein the organosilane of formula (III) is an organotriethoxysilane and/or tetraethoxysilane.

9. A crosslinking RTV1 silicone rubber mixture as claimed in claim 1, wherein the end groups in formula (I) are 1-(2-pyrrolidinon-1-yl)alkyldialkoxysiloxy and/or 2-(2-pyrrolidinon-1-yl)alkyldialkoxysiloxy radicals, or 1-(N-methylacetamido)alkyldialkoxysiloxy and/or 2-(N-methylacetamido)alkyldialkoxysiloxy radicals.

10. A crosslinking RTV1 silicone rubber mixture as claimed in claim 2, wherein $R^5$ is selected from the group consisting of methyl, ethyl, phenyl, vinyl and trifluoropropyl, and n has values from 100–1600.

11. A crosslinking RTV1 silicone rubber mixture as claimed in claim 10, wherein the hydroxyl-terminated polydiorganosiloxane of formula (IV) is an α, ω-dihydroxypolydimethylsiloxane.

12. A crosslinking RTV1 silicone rubber mixture as claimed in claim 1, wherein the alkoxysilane of formula (II) is selected from the group consisting of N-1-(triethoxysilyl) ethylsuccinimide, N-2-(triethoxysilyl)ethylsuccinimide, N-1-(triethoxysilyl)ethylphthalimide, N-2-(triethoxysilyl) ethylphthalimide, N-1-(trimethoxysilyl)ethyl-2-pyrrolidone, N-2-(trimethoxysilyl)ethyl-2-pyrrolidone, N-1-(tri-n-propoxysilyl)ethyl-N-methylacetamide, N-2-(tri-n-propoxysilyl)ethyl-N-methylacetamide, N-1-(tris(2- methoxyethoxy)silyl)ethyl-N-methylthioacetamide and N-2-(tris(2-methoxyethoxy)silyl)ethyl-N-methylthioacetamide.

13. A crosslinking RTV1 silicone rubber mixture as claimed in claim 6, wherein the reaction product is selected from the group consisting of 1,3-bis(1'-N-methylacetamidoethyl)-1,1,3,3,-tetraethoxydisiloxane and 1-N-((diethoxymethylsiloxy)diethoxysilyl)-2-ethylpyrrolidone.

14. A crosslinking RTV1 silicone rubber mixture as claimed in claim 1, further comprising: (d) up to 40% by weight of a plasticizer.

15. A crosslinking RTV1 silicone rubber mixture as claimed in claim 14, wherein the plasticizer is a trimethylsilyl-terminated polydimethylsiloxane having a viscosity of from 0.05 to 10 Pas.

16. A crosslinking RTV1 silicone rubber mixture as claimed in claim 14, further comprising: (e) from 0.01 to 5% by weight of a catalyst.

17. A crosslinking RTV1 silicone rubber mixture as claimed in claim 16, further comprising: (f) up to 30% by weight of a filler.

18. A silicone rubber comprised of the crosslinking RTV1 silicone rubber mixture as claimed in claim 1, which mixture has been crosslinked.

19. A process for preparing a crosslinking RTV1 silicone rubber mixture comprising mixing at least one polydiorganosiloxane with dialkoxyorganosiloxy end groups, of the formula (I);

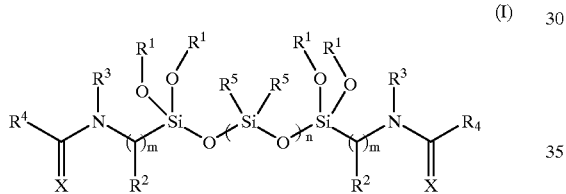

(b) at least one alkoxysilane of the formula (II) and/or partial hydrolyzates thereof;

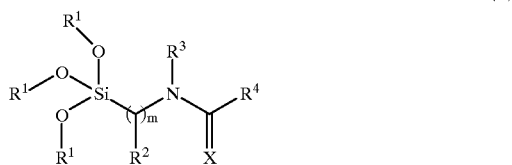

and (c) at least one organosilane of the formula (III) and/or partial hydrolyzates thereof,

where $R^1$, independently of one another, are unsubstituted and/or substituted alkyl and/or silyl radicals, $R^2$, independently of one another, are unsubstituted and/or substituted, saturated and/or unsaturated alkyl and/or aryl radicals and/or hydrogen, $R^3$ are unsubstituted or substituted, saturated or unsaturated alkyl, aryl or acyl radicals or hydrogen, $R^4$ are unsubstituted or substituted, saturated or unsaturated alkyl or aryl radicals or hydrogen, and where the radicals $R^3$ and $R^4$ may form alicyclic or heterocyclic rings, $R^5$, independently of one another, are unsubstituted and/or substituted alkyl, alkenyl and/or aryl radicals, X is oxygen or sulfur, n is from 20 to 2000, m is either 1 or 2 and x is either 0 or 1.

20. A process for producing a silicone rubber comprising mixing at least one polydiorganosiloxane with dialkoxyorganosiloxy end groups, of the formula (I);

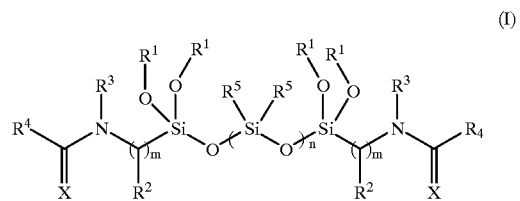

(b) at least one alkoxysilane of the formula (II) and/or partial hydrolyzates thereof;

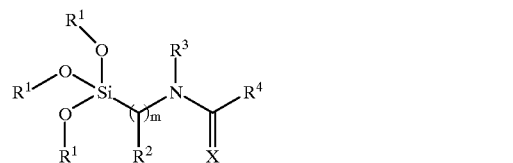

and (c) at least one organosilane of the formula (III) and/or partial hydrolyzates thereof,

where $R^1$, independently of one another, are unsubstituted and/or substituted alkyl and/or silyl radicals, $R^2$, independently of one another, are unsubstituted and/or substituted, saturated and/or unsaturated alkyl and/or aryl radicals and/or hydrogen, $R^3$ are unsubstituted or substituted, saturated or unsaturated alkyl, aryl or acyl radicals or hydrogen, $R^4$ are unsubstituted or substituted, saturated or unsaturated alkyl or aryl radicals or hydrogen, and where the radicals $R^3$ and $R^4$ may form alicyclic or heterocyclic rings, $R^5$, independently of one another, are unsubstituted and/or substituted alkyl, alkenyl and/or aryl radicals, X is oxygen or sulfur, n is from 20 to 2000, m is either 1 or 2 and x is either 0 or 1, and allowing the mixture to crosslink through exposure to atmospheric moisture to form a silicone rubber.

* * * * *